Nov. 26, 1968  E. L. STOCKWELL  3,412,882
TILTABLE LOADING AND UNLOADING TRUCK BED CONSTRUCTION
Filed May 31, 1967  3 Sheets-Sheet 2
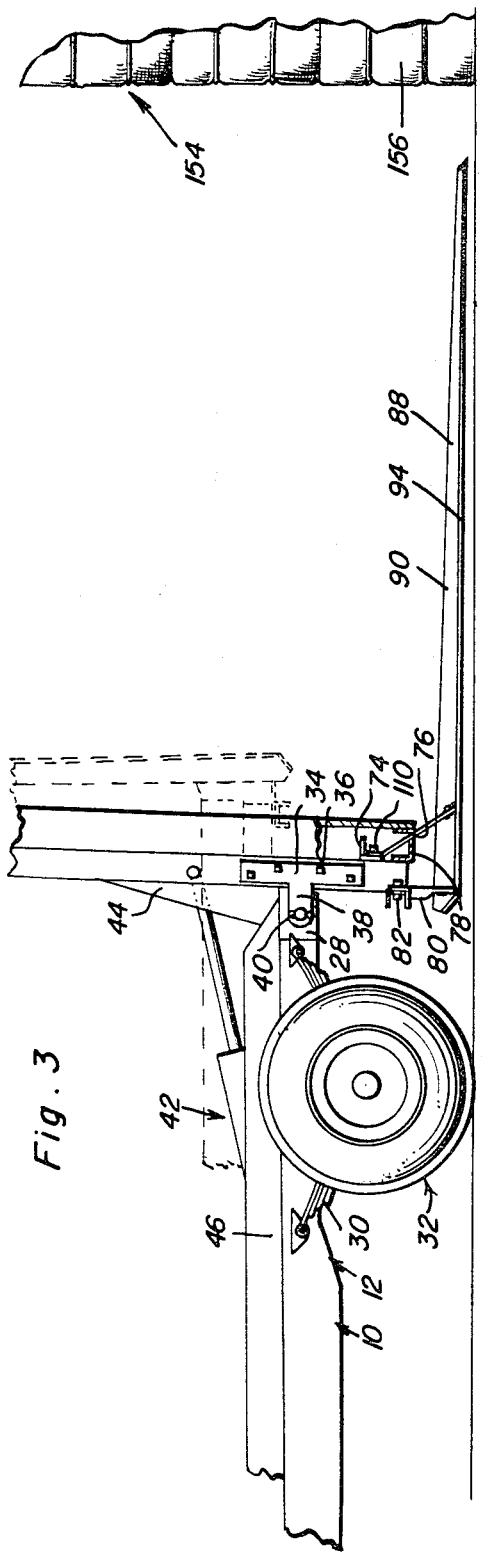
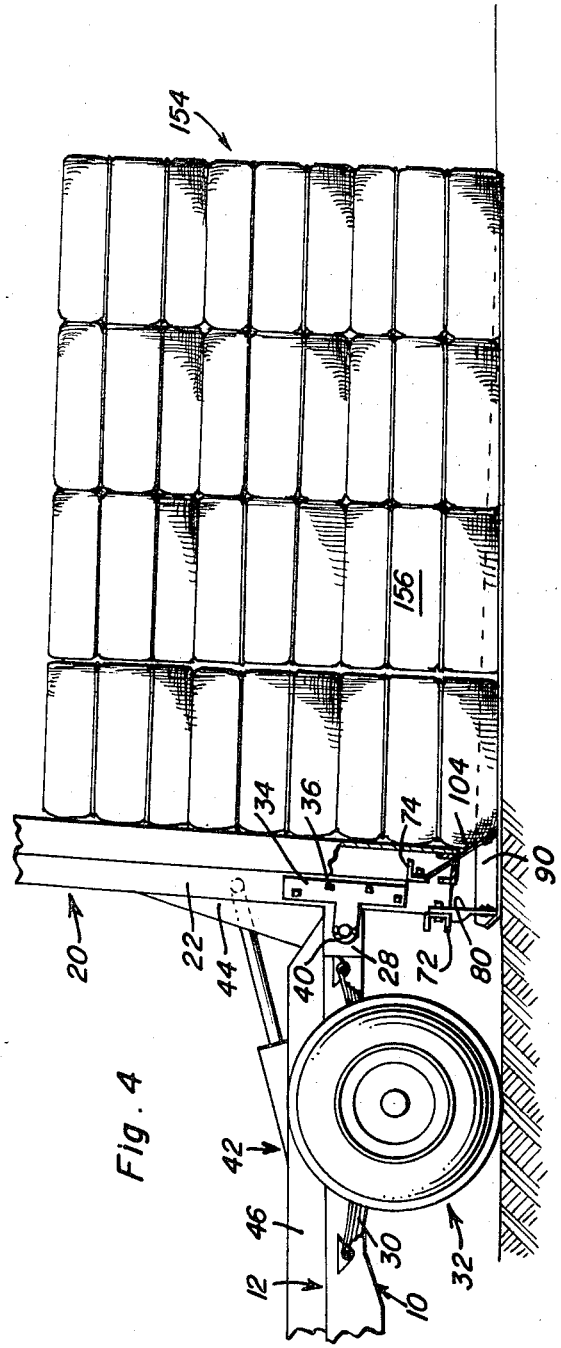
Elmer L. Stockwell
INVENTOR.

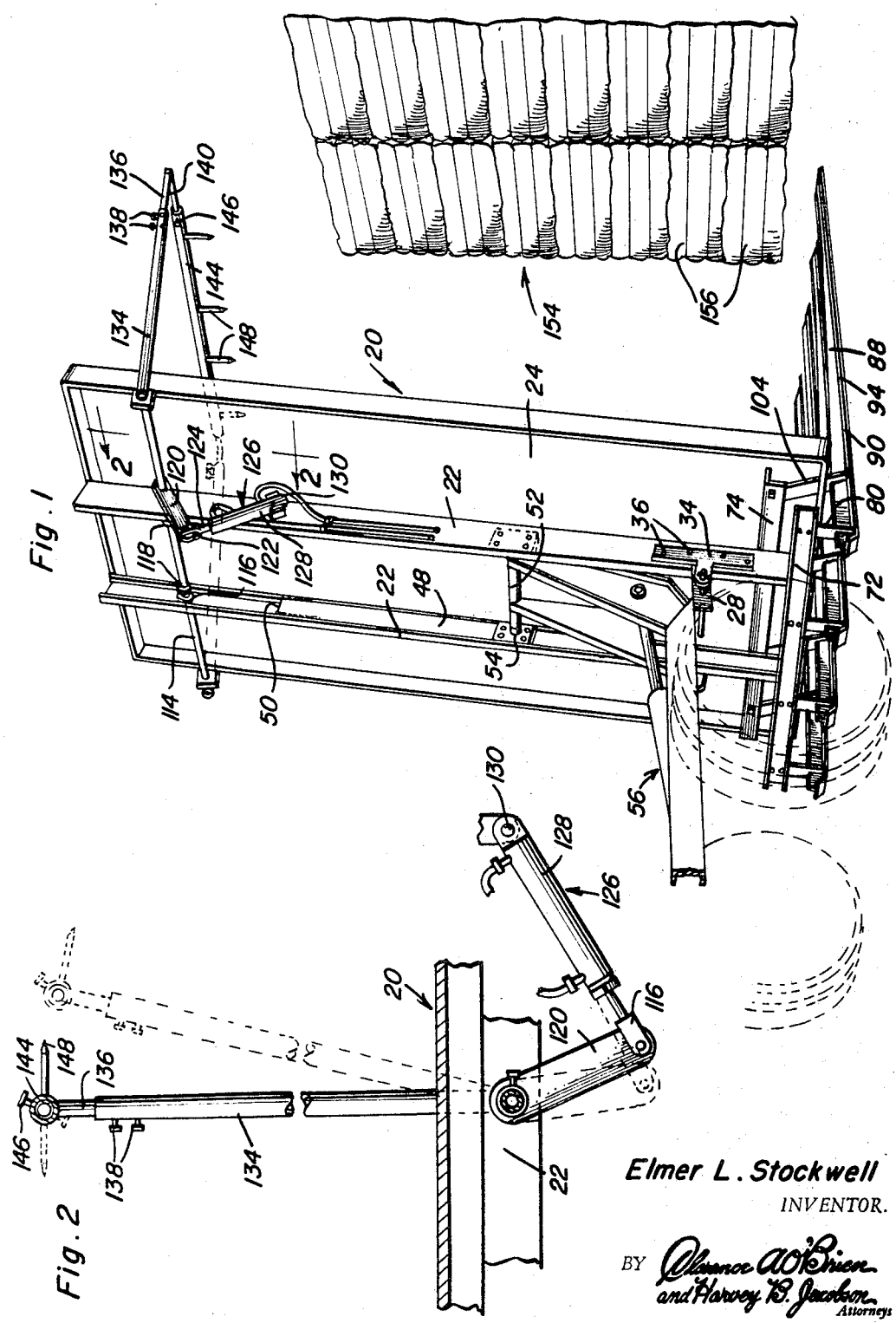

Nov. 26, 1968    E. L. STOCKWELL    3,412,882
TILTABLE LOADING AND UNLOADING TRUCK BED CONSTRUCTION
Filed May 31, 1967    3 Sheets-Sheet 3

Elmer L. Stockwell
INVENTOR.

BY Clarence A. O'Brien
and Harvey B. Jacobson
Attorneys

United States Patent Office 3,412,882
Patented Nov. 26, 1968

3,412,882
TILTABLE LOADING AND UNLOADING
TRUCK BED CONSTRUCTION
Elmer L. Stockwell, Greybull, Wyo., assignor to Stockwell
Manufacturing Company, a corporation of Wyoming
Filed May 31, 1967, Ser. No. 642,499
13 Claims. (Cl. 214—501)

ABSTRACT OF THE DISCLOSURE

A vehicle frame including sprung wheeled rear running gear means and a load bed overlying the frame and pivotally secured to the latter for swinging movement between a first generally horizontally disposed load carrying position and a second upstanding position swung at least slightly past a vertical position with the forward end of the load bed swung upwardly and the rear end of the load bed swung downwardly rearwardly of the wheels of the running gear means, the load bed including upstanding, transversely spaced and at least slightly rearwardly displaced load retaining and lifting teeth which when the load bed is in the second vertical position and in an unladen condition, are slightly rearwardly and downwardly inclined with their rear ends disposed for engagement with the ground and their forward ends spaced slightly above the ground.

The vehicle of the instant invention has been specifically designed to provide a vehicle from which a plurality of stacked hay bales may be unloaded simultaneously as an integral load unit. The vehicle includes a tiltable load bed provided with rearwardly displaced upstanding load retaining and lifting teeth which are slightly rearwardly and downwardly inclined when the load bed is pivoted to its unloading position slightly past a vertical position and the teeth are positioned so that their rear free ends engage the ground and their forward ends are spaced slightly above the ground when the load bed is unladened. In this manner, when a load of a plurality of hay bales is supported from the load bed and the weight of the load is primarily supported from the teeth when the load bed is in its substantially vertical load dumping position the load bed will be downwardly displaced relative to the running gear of the vehicle so as to unable the portions of the hay bales disposed between the teeth to engage the ground and be frictionally retained against horizontal shifting relative to the ground as the vehicle is moved forwardly to withdraw the teeth from beneath the load of hay bales. In this manner, an entire load of hay bales may be unloaded from the vehicle without means carried by the load bed operative to push the load from the load bed as the vehicle is moved forwardly. In the past such pushing mechanisms have been utilized on substantially all hay stacking vehicles of this type and the provision of a hay stacking vehicle which does not require such a pushing mechanism results in a considerable savings merely by the elimination of such a pushing mechanism and its controls.

In addition to the specific positioning of the load retaining and lifting teeth of the vehicle of the instant invention providing a means whereby a stack of hay bales on the vehicle may be readily unloaded therefrom as a single load unit, this specific positioning of the lifting teeth also enables the vehicle of the instant invention to load a haystack or a portion thereof onto the vehicle. The slightly rearwardly and downwardly inclined lifting teeth are adapted to be wedged beneath a haystack disposed on the ground as the associated vehicle is backed toward the haystack. After the teeth have been wedged beneath a haystack or a portion of a haystack, the load bed of the vehicle may then be pivoted toward the horizontally disposed position in a manner such that the hay bales disposed above the lifting teeth are pivoted with the load bed forwardly into a position overlying the frame of the vehicle.

The main object of this invention is to provide a vehicle which will be operative to unload an entire load of hay bales as an integral load unit in a manner retaining the hay bales in stacking position and without any means being required to push the load of hay bales from the vehicle.

Another object of this invention is to provide a vehicle in accordance with the immediately preceding object and constructed in a maner whereby an entire stack of hay bales or a portion of a stack of hay bales may be readily loaded onto the vehicle simultaneously as a single load unit.

Still another object of this invention is to provide an assemblage of component parts which may be utilized to convert a conventional flat-bed truck into a vehicle capable of loading and unloading a plurality of hay bales as an integral load unit.

A further object of this invention is to provide a vehicle in accordance with the preceding objects specifically adapted to handle stacks of bound rectangular hay bales.

A final object of this invention to be specifically enumerated herein is to provide a vehicle in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the tiltable load bed portion of a truck constructed in accordance with the present invention and the double-acting hydraulic ram assembly utilized to swing the tiltable load bed relative to the associated truck frame, the rear wheels of the associated truck being illustrated in phantom lines and the tiltable load bed being disposed in the loading and unloading position adjacent a stack of hay bales to be loaded on the associated truck;

FIGURE 2 is an enlarged fragmentary sectional view taken substantially upon the plane indicated by the section line 2—2 of FIGURE 1;

FIGURE 3 is a fragmentary side elevational view of a truck constructed in accordance with the present invention and with the tiltable load bed portion pivoted to the loading and unloading position and in position to be advanced toward a stack of hay bales preparatory to loading the hay bales on the truck;

FIGURE 4 is a view similar to FIGURE 3 but illustrating the load retaining and lifting arms of the tiltable load bed portion of the truck wedged rearwardly beneath the stack of hay bales illustrated in FIGURE 3;

Figure 7:
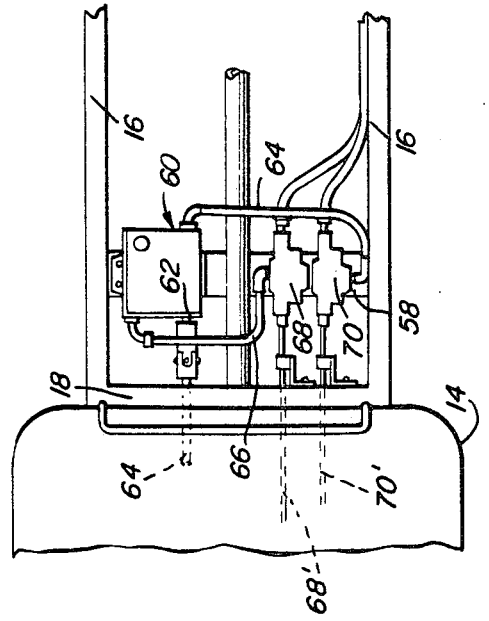
FIGURE 7 is a fragmentary top plan view of the central portion of a truck vehicle illustrating the manner in which the hydraulic pump and hydraulic valve may be supported from a transverse member of the frame of the truck and the hydraulic pump may be driven by the power take-off of the truck.
Figure 6:
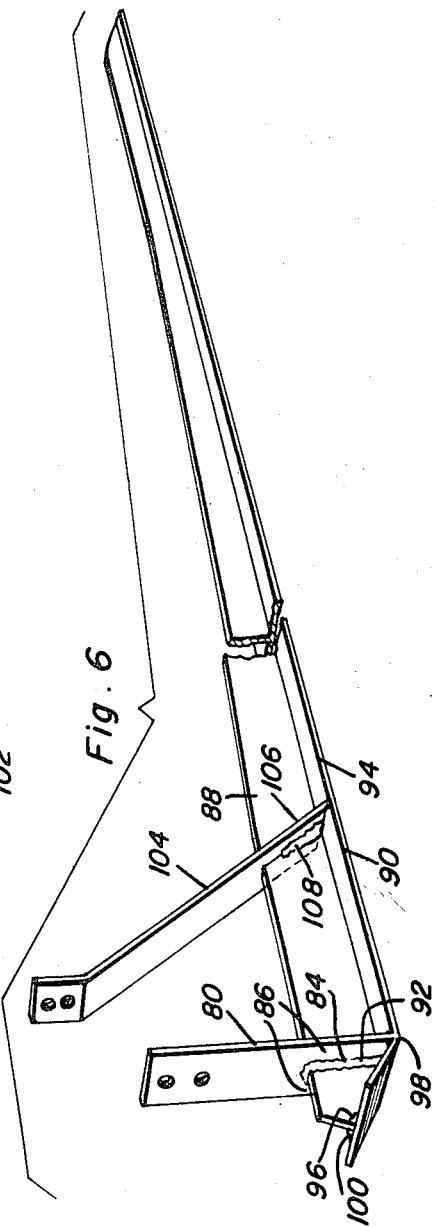
FIGURE 6 is an enlarged perspective view of one of the lifting arms of the instant invention.
Figure 5:
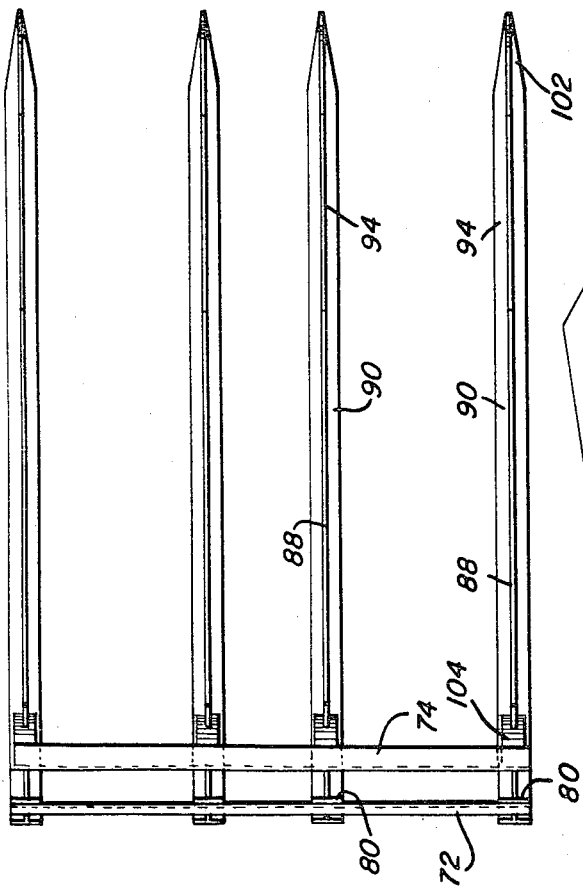
FIGURE 5 is a plan view of the load retaining and lifting arm assembly disposed in a horizontal position.

Referring now more specifically to the drawings the numeral 10 generally designates a conventional truck vehicle including a main frame referred to in general by the reference numeral 12. The main frame 12 has the conventional cab portion 14 of the truck supported from its forward end and includes a pair of longitudinal opposite frame members 16 interconnected at several locations intermediate the opposite ends by means of transverse brace members such as transverse brace member 18, see FIGURE 7.

The vehicle 10 includes a load bed referred to in general by the reference number 20 which is in the form of a platform beneath which a pair of longitudinally extending body sills 22 extend. The sills 22 terminate rearwardly slightly forward of the rear end of the platform portion 24 of the load bed 20 and are secured to the platform portion 24 in any convenient manner (not shown).

The load bed 20 may originally be of the stationary type whose sills 22 may be secured to the frame members 16 in any convenient manner. However, in order to provide a vehicle which is capable of loading and unloading a plurality of hay bales the load bed 20 is removed from stationary securement with the frame members 16 and is pivotally supported therefrom in the following manner.

A pair of reinforcing plates 28 are secured to the rear ends of the frame members 16 after the latter have been cut to the proper length extending rearwardly of the rear hangers for the leaf spring assemblies 30 from which the rear axle assembly generally referred to by the reference numeral 32 is supported and a pair of sill hanger brackets 34 are secured to the sills 22 adjacent their rear ends in proper position in any suitable manner such as by bolts 36 and/or by welding. The hanger brackets 34 include depending portions 38 through which end portions of pivot shafts 40 are journalled, the pivot shafts 40 being secured through the reinforcing plates 28 and the corresponding frame members 16. In this manner, the load bed 20 is pivotally supported from the rear of the frame 12 for swinging movement between a horizontal position closely overlying the frame members 16 and an upstanding position such as that illustrated in FIGURES 1, 3 and 4 with the load bed 20 swung slightly past a vertical position.

Thereafter, a double-acting power ram assembly generally referred to by the reference numeral 42 and including a pair of pivotally interconnected arm assemblies 44 and 46 may have its arm assembly 46 suitably secured to the frame members 16 in any convenient manner and the free end of its arm assembly 44 pivotally secured to a pair of elongated filler and reinforcing channel members secured in the channel members defining the sills 22 in any convenient manner such as by welding 50. The free end of the arm assembly 44 includes a transversely extending pivot shaft 52 whose opposite end portions are suitably journalled in journal brackets 54 mounted on the reinforcing channel members 48. In this manner, the arm assembly may swing relative to the arm assembly 46 as the load bed 20 swings between its substantially horizontal and vertical positions. Of course, it will be noted that the power ram assembly 42 includes a double-acting hydraulic cylinder referred to in general by the reference numeral 56 which is operatively connected between the arm assemblies 44 and 46 for swinging the arm assembly 44 relative to the arm assembly 46 and thereby causing the load bed 20 to swing between the vertical and horizontal position thereof.

The frame 12 includes a supplemental transverse brace 58 which may best be seen in FIGURE 7 of the drawings upon which a hydraulic pump and reservoir assembly generally referred to by the reference numeral 60 is supported. The assembly 60 includes an input shaft 62 to which the power take-off shaft 64 of the vehicle 10 is drivingly connected and a pressure output line 66 as well as a return line 64. Further, manually actuatable control valves 68 and 70 are mounted on the brace 58. The control valves 68 and 70 are provided with suitable control cables 68′ and 70′ which may be actuated from any suitable remote location such as the interior of the cab portion 14.

The rear end of the load bed 20 is reinforced by means of a transversely extending and downwardly opening channel member 72 secured to the sills 22 in any convenient manner such as by welding. In addition, a transversely extending angle member 74 is secured to the upper surface of the frame members 16 adjacent their rear ends and suitable slots 76 are provided in the rear transverse channel member 78 of the load bed 20 for a purpose to be hereinafter more fully set forth.

A plurality of notched support arms 80 are provided and secured to the transverse channel-shaped brace member 72 by means of suitable fasteners such as bolts 82 at one set of corresponding ends and the other set of corresponding ends of the support arms 80 are longitudinally slotted as at 84 so as to define pairs of furcations 86 between which the flange portions 88 of a plurality of load retaining and lifting teeth 90 are secured by welding 92. The teeth 90 are T-shaped in cross-section and include base flange portions 94 disposed at substantially right angles to the flange portions 88 thereof.

The base ends of the teeth 90 to which the support arms 80 are secured have their flange portions 88 cut-away as at 96 and the adjacent portions of the base flange portions 94 are bent as at 98 and welded to the flanged portions 88 as at 100 so as to provide the teeth 90 with forwardly and upwardly inclined end portions when the teeth 90 are horizontally disposed.

The flange portions 88 of the teeth 90 gradually taper toward the free ends of the teeth 90 and the extreme free ends of the base flange portions 94 are tapered as at 102. Further, each of the teeth 90 includes a second support arm 104 including a bifurcated end 106 welded to the corresponding tooth 90 as at 108 and which passes through the corresponding slot 76 intermediate its opposite end and has its free end secured to an angle member 74 by means of a suitable fastener such as a bolt 110. Accordingly, it may be seen that the load retaining and lifting teeth 90 are suitably braced so as to be adapted to lift a considerable load from the ground as the load bed 20 is pivoted from the upstanding position illustrated in FIGURE 4 of the drawings to a horizontally disposed position overlying the frame members 16.

With attention now invited more specifically to FIGURES 1 and 2 of the drawings it may be seen that a transverse operating shaft 114 is journalled through the forward ends of the sills 22 by means of bearings 116 welded in the sills 22 and adjustable abutment collars 118 mounted on the operating shaft 114. The operating shaft 114 has one end of an actuating arm 120 secured thereto and the bifurcated free end 122 of the piston rod portion 124 of a double-acting hydraulic cylinder referred to in general by the reference numeral 126 is pivotally secured to the free end of the operating arm 120. The base end of the cylinder portion 128 of the double-acting hydraulic cylinder 126 is pivotally secured to the adjacent sill 22 as at 130. The hydraulic cylinder assembly 126 is actuated by the control valve 70 while the control valve 68 operates the hydraulic cylinder 56.

The free end portions of the operating shaft 114 have a pair of clamp arms 134 mounted thereon including extendable end portions 136 which may be retained in adjusted extended position by means of suitable setscrews 138. The upper ends of the extendable end portions 136 are interconnected by means of a longitudinally extendable transverse arm 140 having a pipe 144 journalled on its mid-portion and which may be secured in adjusted rotated position by means of a pair of opposite end setscrews 146. The pipe 144 includes a plurality of laterally outwardly projecting load engaging tines 148 for a purpose hereinafter to be more fully set forth.

With attention now invited more specifically to FIGURES 3 and 4 of the drawings it will be noted that when attaching the teeth 90 to the load bed 20 by means of the support arms 80 and 104 and the brace 82 as well as the angle member 74 (after the pivot axis of the load bed 20 relative to the frame 12 has been properly located), the teeth 90 are slightly rearwardly and downwardly inclined when the load bed 20 is in the fully raised position, swung approximately 98° from a horizontal position, so that the free rearward ends of the teeth 90 rest upon the ground on which the vehicle 10 is disposed when there is no load being supported from the load bed 20 or the teeth 90. When the load bed 20 is thus positioned and unladened, the forward or base ends of the teeth 90 are spaced approximately 1 inch above the ground at the point the support arms 104 are secured to the teeth 90. When the load bed 20 is unladen the leaf spring assemblies 30 are more sharply bowed and the rear end of the frame 12 and thus the pivot axis defined between the load bed 20 and the frame 12 is at its highest elevation relative to the ground. When disposed in the position illustrated in FIGURE 3 of the drawings, the teeth 90 may be rearwardly advanced beneath the stack 154 of hay bales 156. This is accomplished by moving the vehicle 10 in a rearward direction toward the stack 154, during which movement of the vehicle 10 the teeth 90 wedge rearwardly beneath the lowermost bales 156 of the stack 154. Then, with the tines 148 extending downwardly as illustrated in FIGURE 1, the hydraulic cylinder 126 is extended so as to force the lower ends of the tines 148 down into the top of the stack 154 above the rear ends of the teeth 90. Thereafter, the hydraulic cylinder 56 is actuated so as to contract the latter and cause the load bed 20 to pivot from the vertically disposed position illustrated in FIGURE 4 of the drawings to a horizontally disposed position during which swinging movement of the load bed 20 the stack 154 disposed between the teeth 90 and the arms 134 will be swung into a horizontal position over the frame 12 of the vehicle 10. Thereafter, the vehicle 10 may be driven to any suitable location at which it is desired to unload this stack 154.

When it is desired to unload the stack 154, the hydraulic cylinder 156 is extended so as to pivot the load bed 20 to the overcenter position illustrated in FIGURE 4 of the drawings and the hydraulic cylinder 126 is contracted so as to swing the free ends of the arms 134 upwardly from the top of the stack 154. Inasmuch as the flange portions 88 inwardly depress the adjacent portions of the bales 156 opposing the teeth 90, the portions of the bales 156 disposed between the teeth 90 engage and rest upon the ground. There is sufficient frictional engagement between the lowermost bales of the stack 154 and the ground, due to the rear end of the frame 12 being lowered relative to the ground by flexing of the leaf spring assemblies 30 when a major portion of the load of the stack 154 is supported from the teeth 90 in cantilevered fashion behind the rear of the frame 12, to enable the vehicle 10 to be moved forwardly so as to withdraw the teeth 90 from beneath the stack 154 while the stack is maintained in stationary position upon the ground.

Accordingly, it may be seen that the positioning of the teeth 90 relative to the ground and the slightly rearwardly downwardly inclined position of the teeth 90 when the load bed 20 is in the dumping position illustrated in FIGURES 3 and 4 of the drawings is extremely important. As can be seen in FIGURE 3 of the drawings all but the rearmost ends of the teeth 90 are spaced above the ground when the load bed is unladen. On the other hand, when the stack 154 is positioned on the teeth 90 and a considerable portion of the load represented by the stack 154 is being supported from the teeth 90 and thus the load bed 20, the rear end of the frame 12 is slightly downwardly depressed toward the ground bringing even the forward or base ends of the teeth 90 into contact with the ground.

Although a considerable portion of the weight of the stack 154 is supported from the teeth 90 when the stack and load bed 20 are positioned as illustrated in FIGURE 4 of the drawings, a considerable portion of the weight of the stack 154 is supported directly from the ground due to the portions of the bales 156 between the teeth 90 resting upon the ground. Thus, the rear wheels of the vehicle 10 do not have an excessive tendency to dig down into the ground as the vehicle 10 is being pulled forwardly away from the stack 154 and the slightly rearwardly and downwardly inclined disposition of the teeth 90 enable even the last bales 156 from beneath which the teeth 90 are withdrawn to be maintained in position on the ground as the vehicle 10 is being advanced forwardly away from the stack 154.

Although it has been pointed out hereinbefore that the vehicle 10 may be loaded by picking up the stack 154, it is to be noted that the vehicle 10 may be loaded in the field with successively positioned bales 156, during which loading the sleeve or pipe 144 is rotated 180° so that the tines 148 project forwardly and are thus not as likely to injure persons loading the vehicle 10. Then, after the vehicle 10 has been fully loaded in the field, the pipe 144 may be again rotated to the position thereof illustrated in FIGURE 1 of the drawings and the vehicle 10 may be driven to a suitable point for stacking the hay bales 156 and unloaded in the manner hereinbefore set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle frame including sprung wheeled rear running gear means, a load bed overlying said frame and pivotally secured to the latter for swinging movement between a first generally horizontally disposed load carrying position and a second upstanding position swung at least generally to a vertical position with the forward end of said load bed swung upwardly and the rear end of said load bed swung downwardly rearwardly of the wheels of said running gear means, means operatively connected between said frame and said load bed for swinging the latter between said first and second positions, said load bed including upstanding, transversely spaced and at least slightly rearwardly displaced load retaining and lifting teeth when said load bed is in said first position, said teeth, when said load bed is in said second position and unladen, being spaced slightly above the ground, whereby when said load bed is laden and in said second position with the load resting primarily on said teeth, said load bed will be lowered relative to the ground by the weight of the load acting upon the frame and spring suspension and said load, being indented slightly by said teeth, will contact said ground between said teeth and be frictionally retained against horizontal shifting relative to the ground as said vehicle is moved forwardly to withdraw said teeth from beneath said load.

2. The combination of claim 1 wherein said load bed includes forward upstanding load retaining and engaging arm means supported from their lower ends for swinging about a horizontal transverse axis, and means operatively connected between said load bed and said arms operative to swing the latter between substantially vertical positions and positions with the upper ends of said arm means slightly rearwardly inclined positions.

3. The combination of claim 2 wherein at least the upper ends of said arm means include rearwardly projecting load gripping projections.

4. The combination of claim 3 wherein said projections are supported from said arm means for angular adjustment about axes generally paralleling the longitudinal center axes of said arm means.

5. The combination of claim 4 wherein said projections are adjustable to positions projecting forwardly of said arm means.

6. The combination of claim 1 wherein said load bed includes forward upstanding load retaining and engaging arm means supported from their lower ends for swinging about a horizontal transverse axis, and means operatively connected between said load bed and said arms operative to swing the latter between substantially vertical positions and positions with the upper ends of said arm means slightly rearwardly inclined positions, at least the upper ends of said arm means including rearwardly projecting load gripping projections, said upper ends of said arm means being extendable longitudinally of said arm means.

7. The combination of claim 1 wherein said means operatively connected between said frame and said load bed comprises a double-acting fluid cylinder.

8. The method of converting a vehicle of the type including a generally horizontal longitudinally extending frame and sprung wheeled rear running gear means as well as a longitudinally extending load bed supported from said frame into a haystack unloading vehicle, said method including the step of pivotally securing said load bed to said frame for swinging movement of said bed relative to said frame about a horizontal transverse axis between a first generally horizontally disposed load carrying position and a second upstanding position swung at least slightly past a vertical position with the forward end of said load bed swung upwardly and the rear end of said load bed swung downwardly rearwardly of the wheels of said running gear means, connecting power means between said frame and said load bed operative to swing the latter between said first and second positions, and attaching upstanding, transversely spaced load retaining and lifting teeth on the rear end portion of said load bed with the teeth displaced at least slightly rearwardly of the rear end of the load bed when said load bed is in said first position and generally horizontally disposed and elevated at least slightly above a position in full engagement with the ground when said load bed is in said second position, whereby when said load bed is laden and in said second position and the load thereon is resting primarily on said teeth, said load bed will be lowered relative to the ground by the weight of the load acting upon the frame and spring suspension and said load, being indented slightly by said teeth, will contact said ground between said teeth and be frictionally retained against horizontal shifting relative to the ground as said vehicle is moved forwardly to withdraw said teeth from beneath said load.

9. The combination of claim 1 wherein said teeth include substantially planar rearwardly facing surface means adapted to engage and slide along the ground when said load bed is in said second position and forwardly projecting flange portions adapted to indent the opposing portions of a load on said load bed.

10. The method of claim 8 including the step of reinforcing said load bed with transversely spaced longitudinal members extending longitudinally of said load bed on opposite sides of the area thereof to which said power means is connected.

11. The method of claim 8 including the step of attaching transversely spaced and upstanding load retaining and gripping arm means to the forward end of said load bed for swinging movement of said arms between first generally vertical positions and second positions with their upper ends inclined slightly rearwardly and attaching power means between said load bed and said arm means for swinging the latter between their first and second positions.

12. The combination of claim 1 wherein said teeth, when said load bed is in said second position and unladen, are slightly rearwardly and downwardly inclined with their rearward ends disposed for engagement with the ground and their forward ends spaced slightly above the ground.

13. In combination, a vehicle frame including sprung wheeled rear running gear means, a load bed overlying said frame and pivotally secured to the latter for swinging movement between a first generally horizontally disposed load carrying position and a second upstanding position swung at least generally to a vertical position with the forward end of said load bed swung upwardly and the rear end of said load bed swung downwardly rearwardly of the wheels of said running gear means, means operatively connected between said frame and said load bed for swinging the latter between said first and second positions, said load bed including upstanding, transversely spaced and at least slightly rearwardly displaced load retaining and lifting teeth when said load bed is in said first position, said teeth, when said load bed is in said second position and unladen, being spaced slightly above the ground, whereby as said vehicle is moved rearwardly so as to advance toward a stack of hay said rear ends of said teeth will wedge rearwardly beneath said stack between the latter and the ground upon which said stack rests and as a portion of the weight of said stack is supported from said teeth said load bed will be lowered relative to the ground by said portion of the weight of the stack acting upon the frame and spring suspension and said stack, being indented slightly by said teeth, will contact said ground and be frictionally retained against horizontal shifting relative to the ground as said teeth are fully wedged beneath said stack, and means connected between said load bed and said frame operable to swing said load bed from said second position toward said first position.

References Cited

UNITED STATES PATENTS

| | | | |
|---|---|---|---|
| 2,578,802 | 12/1951 | Heidrick et al. | 214—512 |
| 2,726,115 | 12/1955 | Babcock et al. | 214—501 |
| 3,013,682 | 12/1961 | Unruh | 214—501 |
| 3,289,859 | 12/1966 | Tarbox | 214—6 |

ALBERT J. MAKAY, *Primary Examiner.*